United States Patent [19]
Kaczmarczyk et al.

[11] Patent Number: 5,625,796
[45] Date of Patent: Apr. 29, 1997

[54] METHOD AND APPARATUS FOR CONCURRENTLY ACCESSING MULTIPLE MEMORIES WITH DIFFERENT TIMING REQUIREMENTS

[75] Inventors: John M. Kaczmarczyk, Niles; Dale R. Buchholz, Palatine; Jeffrey A. Slawecki, Oak Lawn, all of Ill.

[73] Assignee: Motorola, Inc., Schaumburg, Ill.

[21] Appl. No.: 584,725

[22] Filed: Jan. 11, 1996

Related U.S. Application Data

[63] Continuation of Ser. No. 242,684, May 12, 1994, abandoned, which is a continuation of Ser. No. 1,424, Jan. 7, 1993, abandoned, which is a continuation of Ser. No. 415,828, Oct. 2, 1989, abandoned.

[51] Int. Cl.$^6$ .................................................. G06F 13/16
[52] U.S. Cl. ...................... 395/495; 395/878; 395/880
[58] Field of Search .......................... 364/200 MS File, 364/900 MS File, DIG. 1; 340/750 MS; 395/325, 425, 275, 800, 550, 775, 475, 477, 495, 878, 880

[56] References Cited

U.S. PATENT DOCUMENTS

| | | | |
|---|---|---|---|
| 4,151,593 | 4/1979 | Jenkins et al. | 395/494 |
| 4,432,051 | 2/1984 | Bogaert et al. | 395/550 |
| 4,467,420 | 8/1984 | Murakami et al. | 395/843 |
| 4,481,572 | 11/1984 | Ochsner | 395/297 |
| 4,495,567 | 1/1985 | Treen | 395/287 |
| 4,633,392 | 12/1986 | Vincent et al. | 395/284 |
| 4,688,166 | 8/1987 | Schneider | 395/865 |
| 4,785,396 | 11/1988 | Murphy et al. | 395/286 |
| 4,980,850 | 12/1990 | Morgan | 395/497.03 |
| 5,003,465 | 3/1991 | Chisolm et al. | 395/845 |
| 5,005,121 | 4/1991 | Nakada et al. | 395/846 |
| 5,012,408 | 4/1991 | Conroy | 395/497.03 |
| 5,097,437 | 3/1992 | Larson | 395/775 |

*Primary Examiner*—Tod R. Swann
*Assistant Examiner*—J. Peikari
*Attorney, Agent, or Firm*—Val Jean Hillman

[57] ABSTRACT

A data processing system in which a plurality of processors or other memory access devices operate either synchronously or asynchronously with a memory interface device, which in turn provides access to one or more memory units on a time-division basis. This is accomplished by providing each memory unit a series of time-divisioned access opportunities and controlling the phase relationship between these time-divisioned access opportunities. Accordingly, two or more access devices can address an equal number of memory units simultaneously.

18 Claims, 3 Drawing Sheets

FIRST SERIES OF SYNCHRONIZING ACCESS OPPORTUNITIES
(MEMORY UNIT 8)

SECOND SERIES OF SYNCHRONIZING ACCESS OPPORTUNITIES
(MEMORY UNIT 9)

▒ DATA NOT VALID    ▨ DATA IS VALID

▒ DATA NOT VALID    ▨ ACCESS TIME

METHOD AND APPARATUS FOR CONCURRENTLY ACCESSING MULTIPLE MEMORIES WITH DIFFERENT TIMING REQUIREMENTS

This is a continuation of application Ser. No. 08/242,684, filed May 12, 1994, now abandoned, which is a continuation of application Ser. No. 08/001,424, filed on Jan. 7, 1993, now abandoned, which is a continuation of application Ser. No. 07/415,828, filed on Oct. 2, 1989, now abandoned.

TECHNICAL FIELD

This invention relates generally to data processing systems, and more specifically to the management of the addressing of multiple memories by a plurality of processors.

BACKGROUND OF THE INVENTION

With increased frequency, data processing systems are employing a plurality of independent processors to perform individualized operations. This trend (multi-tasking) is due in part to the increased volume of data capable of being handled by modern semiconductor memory devices, and the desire to perform more than one task at a time.

While multi-tasking is known, there are major drawbacks associated with implementation. One such problem concerns the allocation of resources such as system memory.

When multiple processors are used in a single system, there must be control over when, and in what priority, the various processors will have access to memory. In response to this need, various prior art systems utilizing multiple processors dedicate an entire processor, aided by an advanced operating system, to manage all the allocations of a large main memory. Unfortunately, such a sophisticated operating system is simply not practical for smaller applications.

Another approach suggests that each processor be given an individual dedicated memory. While this presents a much simpler solution, rigidly dedicated memory creates an extremely inflexible data processing environment, the cost of which becomes prohibitive as more processors are added.

Another problem associated with the utilization of multiple processors is the speed at which the data processing system operates. This concern becomes more prominent as one employs processors that operate asynchronously to each other, an interface device, or to the memory units.

In conventional data processing environments, the speed of operation is governed by the slowest processor, herein after referred to as a memory access device. In order to achieve moderately efficient throughput, systems housing both fast and slow memory access devices could either physically separate these devices onto separate buses, partition system resources between the devices, or arrange the system to operate synchronously with the memory unit.

In other prior art systems, a large common memory is subdivided into various discrete pages. Each memory access device is dedicated a page. Within each page, a memory access device can address a plurality of subdivisions or blocks of memory. In this way each memory access device can address memory, yet remain confined to a separate and unique memory environment.

While this approach addresses the above-mentioned problems, it nevertheless demands the use of an extremely large memory unit. Thus, for systems not requiring massive amounts of memory, this solution borders upon the impractical.

Other prior art systems have adopted the single fast memory approach, wherein a plurality of asynchronous memory interface devices access one block of common memory (see FIG. 1). While devices within that plurality operate at various rates, only one can access memory at a time. Accordingly, the common block of memory must have a very fast access time; faster than the rate of operation of the fastest memory access device. By definition, access time is the time required by a memory device to store or retrieve data upon receipt of an address. Presently, fast memories are very expensive. When used in an environment dominated by slower rate transactions, system throughput and efficient economic management is minimized by the failure to utilize full memory capability.

It would, therefore, be extremely advantageous to provide a data processing system employing a plurality of smaller, less expensive memories having various access times. This processing system shall be controlled such that several memory access devices can address several memory units, without the necessity of a complex operating system, or the inflexibilities imposed by dedicated, fast, or large memory.

SUMMARY OF THE INVENTION

In a data processing system which employs a plurality of memory units having a variety of access times, a plurality of memory access devices which operate at various speeds, and a memory interface device connected between them capable of accessing the plurality of memories on a time-division basis while communicating with the access devices in real-time, asynchronous operation is achieved in a manner that reduces the expense and complexity associated with the management of simultaneously addressing multiple memories by a plurality of memory access devices.

DESCRIPTION OF THE PREFERRED EMBODIMENT

Figure 1:
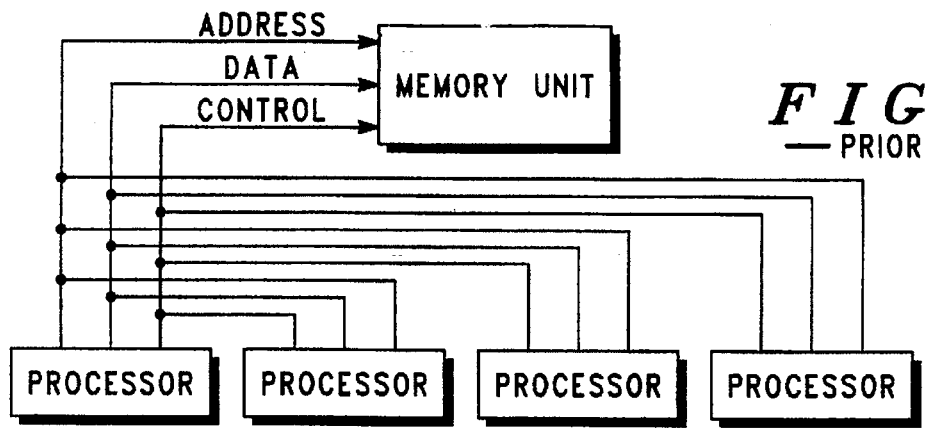
FIG. 1 is a block diagram depiction of a prior art data processing system.
Figure 2:
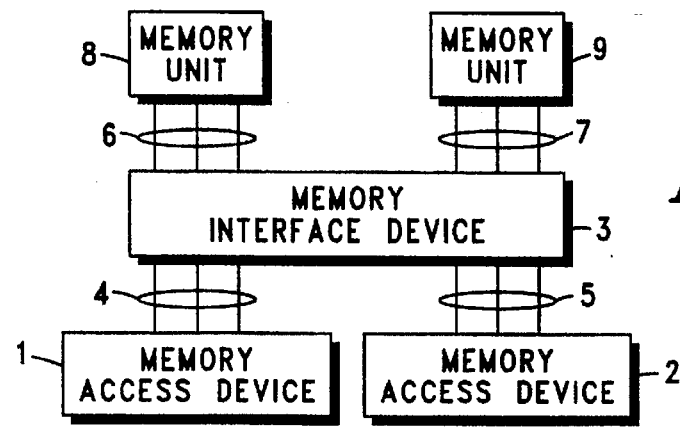
FIG. 2 is a block diagram view of a data processing system configured in accordance with the invention.

FIG. 2 shows a block diagram view of a portion of a data processing system. Since it is understood by those skilled in the art that other components and devices would ordinarily be included in this environment, only those elements pertinent to this invention will be discussed.

In FIG. 2, buses 4 and 5 are shown. It should be noted that each bus actually comprises a plurality of data, address, and control lines. Connected to bus 4 is a memory access device 1, which may be a microprocessor, an programmable controller, counter, or any other device needing to send or receive data from memory. Also connected to bus 4 is the object of this invention, the memory interface device 3. In a similar manner bus 5 is connected to a memory access device 2 and the memory interface device 3.

Additionally, FIG. 2 depicts buses 6 and 7. Like buses 4 and 5, these buses comprise a plurality of data, address, and control lines. Their function is to facilitate communication between the memory interface device 3 and memory units. Bus 6 connects memory unit 8 to the interface device 3, while bus 7 connects memory unit 9 to the interface device 3.

Figure 3:
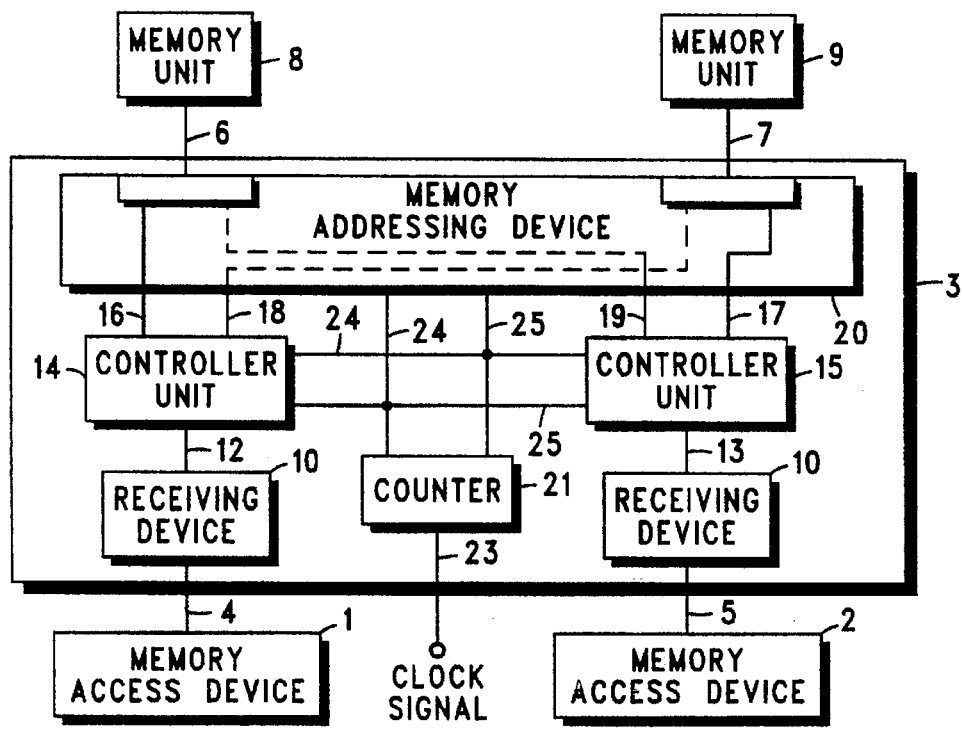
FIG. 3 is a block diagram of the disclosed memory interface device.

Referring now to FIG. 3, a block diagram of the memory interface device 3 is shown. A memory access device 1 places a memory access request on bus 4 as it attempts to address the memory units 8 or 9. The type of information formulating this access request may include a memory access device address, a memory unit address, input/output (I/O) commands, control statements, and/or data.

The access request is routed to a receiving device 10, which accepts and stores device 1 access requests for subsequent processing. In the present embodiment receiving device 10 is a buffer. Its purpose is to buffer all incoming control signals and to latch the data and address components of the access request. It will be appreciated by those skilled in the art that this receiving device may also be implemented through the use of registers, latches, flip-flops, or similar devices.

From buffer 10, access request information is conveyed across bus 12 to a controller unit 14. This information comprises access request control statements, a memory unit address, and any pertinent data for transmission. With this information, controller unit 14 directs the selection of the appropriate memory unit requested and synchronizes the access request to a series of memory access opportunities which correspond to the access time of the selected memory unit. Of importance, the series of synchronizing memory access opportunities are developed from clock signals appearing on bus 23, generated by counter device 21, and presented to the controller unit 14 upon busses 24 and 25. Counter device 21 is programmable counter, yet it will be appreciated that this timing scheme could be practised by the deployment of other timing devices.

In order to complete the interface, controller unit 14 conveys the memory device selection information via buses 16 or 18 to the memory addressing device 20. Additionally, the series of synchronized memory access opportunities are conveyed to the memory addressing device 20 via buses 24 and 25. Accordingly, it is the function of the memory addressing device to select and enable the appropriate memory unit at the time allotted by the various access opportunities, thereby enabling memory access device 1 to address one of the memory units at a time on a time-division or time-shared basis via buses 6 or 7. This time-shared addressing is accomplished by time division multiplexing.

In a similar fashion, memory access device 2 is capable of addressing memory units 8 or 9 by generating various access requests. These requests will be placed on bus 5 and routed to the buffered receiving device 11, which in turn passes the information to controller unit 15 which directs the selection of the appropriate memory unit requested and synchronizes the access request to a series of memory access opportunities corresponding to the access time of the selected memory unit via time-division multiplying.

So configured, the memory resources of the present invention are no longer individually dedicated. Each memory access device can successfully communicate with each memory unit, regardless of operational time differences. In fact, due to the asynchronous operation of the memory access devices, each one of the memory units employed may be concurrently enabled and addressed by one of the available access devices, thereby optimizing system throughput by a more efficient management of system resources. Still, there must be some control over when and in what priority the access devices will have access to the various memory units. According to the present invention, the memory interface device 3 relies upon controller units 14 and 15 to establish when addressing is appropriate, while memory addressing device 20 determines the priority of access.

Figure 4:
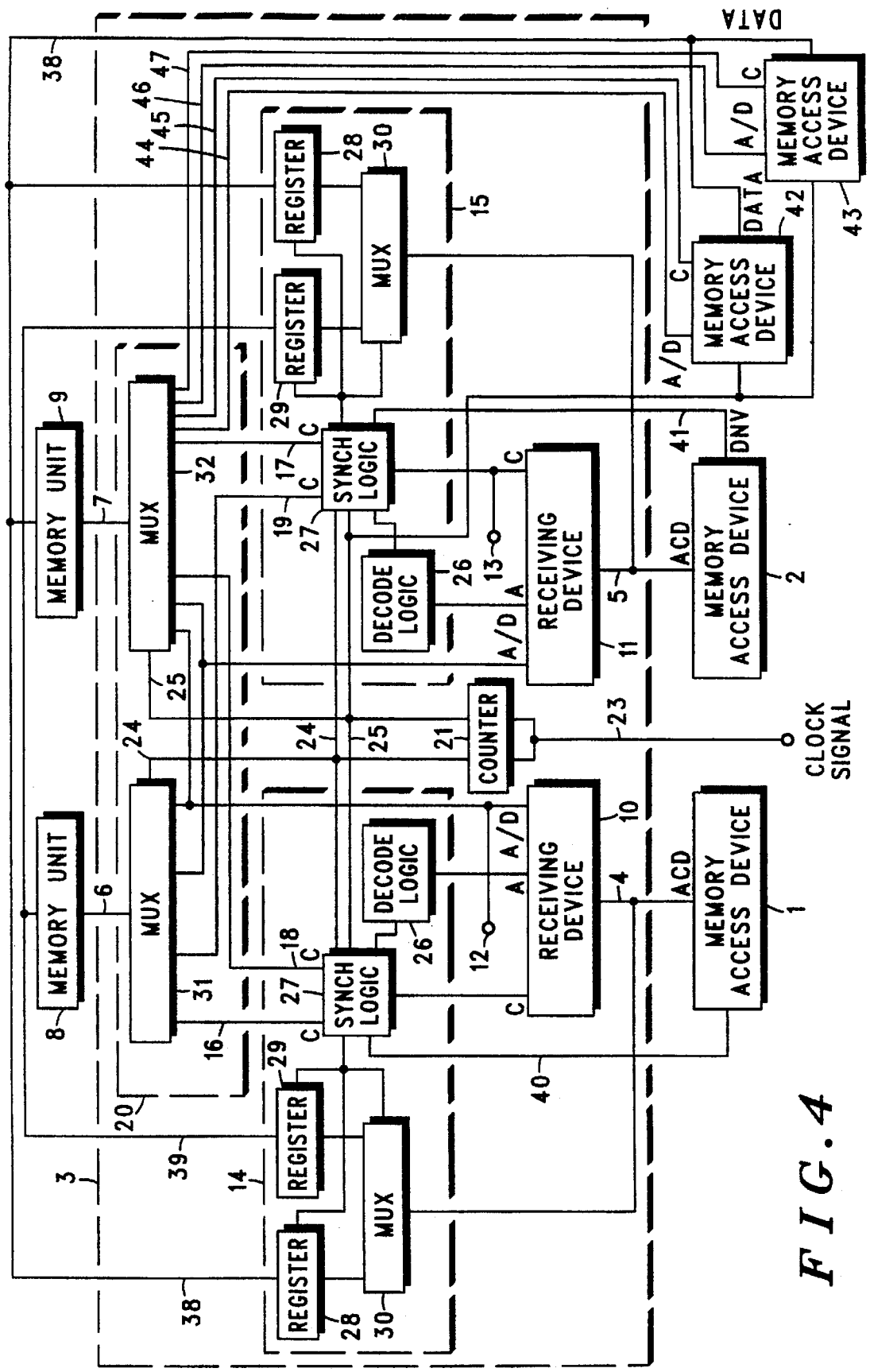
FIG. 4 is a detailed block diagram of the disclosed data processing system.

For further explanation, reference is now made to FIG. 4. In FIG. 4 the controller units 14 and 15 each comprise decode logic 26, sync logic 27, data registers 28 and 29, and a data multiplexer 30. During operation, controller units 14 and 15 receive access requests from their respective receiving devices 10 and 11. The memory unit address portion of each access request is routed to decode logic 26 for deciphering, the control signals are routed to sync logic 27 for synchronizing, and the address and data components are routed to the memory addressing multiplexers 31 and 32 where they are presented to memory. Since the present invention employs time-divisioned multiplexing, however, the memory units will only accept address and data when accompanied by active control signals. Thus, it is one function of sync logic 27 to enable control line 16 or 18 and 17 or 19.

It will be appreciated that memory access devices 1 and 2 operate asynchronously with the memory interface device 3. Accordingly, it is another function of sync logic 27 to synchronize control lines 16 or 18 and 17 or 19 to the requested memory units. In this effort, control line selection is determined by decode logic 26, while synchronization is achieved by using the counter 21 outputs.

Counter 21 is configured such that counter output signal 25 provides a clock rate that substantially mirrors the access time of memory unit 9. Concurrently, counter output signal 24 provides a clock rate that substantially mirrors the access time of memory unit 8. By synchronizing the enable of control line 16 to the counter output signal 24, one effectively synchronizes the control signals of an access request for memory unit 8 to memory unit 8. Similarly, the synchronization of control line 18 enable to the counter output signal 25 effectively synchronizes the control signals of an access request for memory unit 9 to memory unit 9. The same relationship holds true for control lines 17 and 19 of controller unit 15.

In the present invention, synchronization is accomplished by the use of level threshold or edge sensitive circuitry which monitors the counter 21 output signals 24 and 25. Regardless of a control signal's arrival time, sync logic 27 only enables control lines 16 or 18 and 17 or 19 upon the edge of a synchronizing clock pulse from the counter 21. This assures that each addressing transaction is provided a complete access opportunity in which to perform a requested operation.

Assuming the access request commands a write function, data may only be written to the appropriate memory unit during a synchronized access opportunity. Despite the asynchronous operating nature of memory access devices 1 and 2, there must still be some means of synchronizing a write request such that the memory access device knows when to cease transmission of data to the selected memory unit.

According to FIG. 4, sync logic 27 of controller unit 14 provides memory access device 1 with a Data Transfer Acknowledge (DTACK) signal across bus 40. Consequently, memory access device 1 will stop sending data to a selected memory unit when DTACK reaches a certain state. Similarly, sync logic 27 of controller unit 15 provides memory access device 2 with DTACK across bus 41. Accordingly, memory access device 2 will stop the transmission of data during a write cycle when DTACK reaches a specified state.

Upon a read request by memory access device 1, the appropriate memory unit 8 or 9 will place data upon a data bus 38 or 39. This data is subsequently latched into a data register 28 or 29 of controller unit 14. Sync logic 27 of controller unit 14 provides the appropriate control signals which direct these latching functions. From the data register, the data is routed to data multiplexer 30 of controller unit 14, which accepts control signals from sync logic 27 directing it to accept data from the appropriate data register. From data multiplexer 30, the requested data is routed back to memory access device 1 via bus 4.

Upon a read request by memory access device 2, the appropriate memory unit 8 or 9 will place data upon the data buses 38 or 39. This data is subsequently latched into a data register 28 or 29 of controller unit 15. Sync logic 27 of controller unit 15 provides the appropriate control signals which direct these latching functions. From the data register, the data is routed to data multiplexer 30 of controller unit 15, which accepts control signals from sync logic 27 directing it to accept data from the appropriate data register. From data multiplexer 30, the requested data is routed back to memory access device 2 via bus 5. Still, there must be some means of synchronizing a read request, such that a requesting device knows when to begin accepting the data returned by memory units 8 or 9.

As previously discussed, sync logic 27 of controller unit 14 provides memory access device 1 with a DTACK signal across bus 40. Consequently, memory access device 1 will not recognize the data from data multiplexer 30 of controller unit 14 until DTACK reaches a certain state. Similarly, sync logic 27 of controller unit 15 provides memory access device 2 with DTACK via bus 41. Accordingly, memory access device 2 will not respond to the data from data multiplexer 30 of controller unit 15 until DTACK reaches a specified state. In this way the disclosed data processing system can assure the integrity of the data returned from memory.

Further review of FIG. 4 reveals the existence of memory access devices 42 and 43. It will be appreciated by those skilled in the art that these access devices operate synchronously with memory unit 9. This is recognized because both 42 and 43 operate at a rate determined by counter output signal 25. As previously mentioned, counter output signal 25 is selected to substantially mirror the access time rate of memory Unit 9. Due to the synchronized operation of devices 42 and 43, they no longer require a receiving device, controller unit, or memory addressing device in order to address memory unit 9.

Accordingly, the present invention discloses a memory interface device capable of interfacing a plurality of synchronous and asynchronous memory access devices to a plurality of memory units having different access times.

The time-division multiplexed allocation of memory unit 8 and 9 resources are controlled by memory addressing device 20. In particular, memory addressing multiplexers 31 and 32 are responsible for assuring that the access requests of memory access devices 1,2,42 and 43 are presented to the appropriate memory units at the appropriate times. In addition, multiplexers 31 and 32 establish a prioritized sequence that governs the order of addressing, and avoids the possibility of conflicts, despite the fact that two or more access requests for the same resource may be issued simultaneously.

According to FIG. 4, memory addressing multiplexer 31 provides memory access devices 1 and 2 access to memory unit 8. In this effort, multiplexer 31 accepts address, data, and control statements from access device 1 across buses 12 and 16. Similarly, multiplexer 31 accepts address, data, and control statements from access device 2 across buses 13 and 19. Accordingly, buses 12 and 16 comprise the inputs from access device 1 while buses 13 and 19 comprise the inputs from access device 2.

In operation, multiplexer 31 switches back and forth between the access device 1 inputs and the access device 2 inputs looking for possible access requests. As previously mentioned, when an access request control statement is synchronized to memory unit 8, only then will the memory unit act upon the appropriate address, data, and control statements issued by memory access devices 1 and 2. If no control statements are present during the access opportunity, no addressing of memory occurs during that time.

Further review of FIG. 4 reveals that the counter output signal 24 is routed to memory addressing multiplexer 31. In effect, the counter output signal 24 controls the switching rate of multiplexer 31 and provides the system with a first series of clocked access opportunities which correspond to the access time of memory unit 8. Of importance, it is the first series of clocked access opportunities which allows sync logic 27 of controller unit 14 to synchronize control lines 16 or 19 to the requested memory unit 8, thereby providing addressing on a time-division multiplexed basis.

In a similar fashion memory addressing multiplexer 32 provides memory access devices 1, 2, 42 and 43 access to memory unit 9. To this end, multiplexer 32 accepts address, data, and control statements from access device 1 across buses 12 and 18; from access device 2 across buses 13 and 17; from access device 42 across buses 44 and 45; and from access device 43 across buses 46 and 47.

During operation, multiplexer 32 switches through the memory access device inputs in a predetermined order looking, for example, memory access device 1, 2, 42 then 43, for possible access requests. As previously mentioned, when the control statements are synchronized to memory unit 9, only then will the memory unit accept the appropriate address, data, and control statements issued by a requesting device. If no control statements are present during the access opportunity, no addressing of memory occurs during that access opportunity.

Further review of FIG. 4 reveals that the counter output signal 25 is routed to memory addressing multiplexer 31. In effect, the counter output signal 25 controls the switching rate of multiplexer 31 and provides the system with a second series of clocked access opportunities that correspond to the access time of memory unit 9. Of importance, it is the second series of clocked access opportunities that allows sync logic 27 of controller unit 15 to synchronize control lines 18, 17, 45 or 47 to the requested memory unit 9, thereby providing addressing on a time-division multiplexed basis.

Figure 5A:
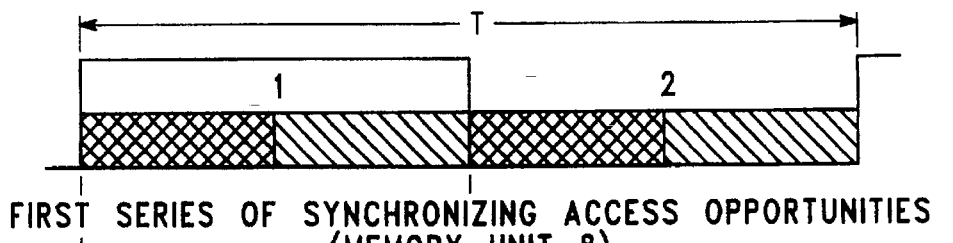
FIG. 5(a) is a timing diagram showing a first series of synchronizing memory access opportunities.
Figure 5B:
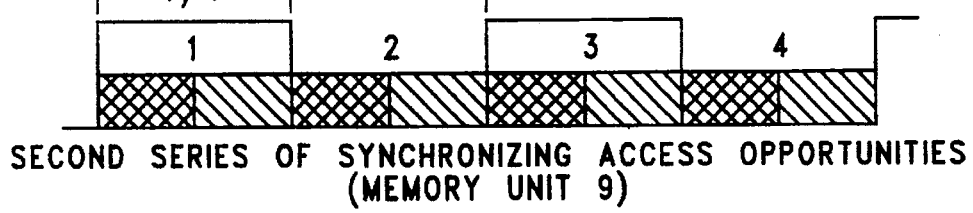
FIG. 5(b) is a timing diagram showing a second series of synchronizing memory access opportunities and the existing in-phase relationship.

Reference is now made to FIG.5(a) and (b). In FIG.5(a) a clocked signal evidencing various timing relationships is shown. From this diagram it will be appreciated that T is the clock rate of the counter 21 input at bus 23. Referring to FIG. 5(b), T/2 is the clock rate of the counter output signal 24 and evidences the access time (Data Not Valid) of memory unit 8. In summary, depicts the first series of synchronizing (clocked memory) access opportunities utilized by sync logic 27 and the memory addressing device 20 when attempting to address memory unit 8.

Of equal importance, FIG.5(a) shows the predetermined access priority that memory addressing multiplexer 31 follows as it switches between memory access device 1 and 2 inputs looking for an access request access opportunity.

FIG.5 (b) reveals yet another clock signal. From this diagram it understood that T/4 corresponds to the aforementioned counter output signal 25 and divulges the access time (Data Not Valid) of memory unit 9. Additionally, FIG.5(b) depicts the second series of memory clocked access opportunities utilized by sync logic 27 and the memory addressing device 20 in the effort to synchronize incoming access requests to memory unit 9. Upon closer inspection, FIG.5(b) reveals the predetermined access priority that memory addressing multiplexer 32 imitates as it switches between device 1, 2, 42, and 43 inputs looking for a access request.

Of greater importance, however, FIGS.5(a) and (b) together reveal that the first and second series of synchronizing memory access opportunities are arranged such that they share a predetermined phase relationship. This relationship is maintained independently of the operating speed of a memory access device attempting to address a memory unit. Consequently, memory access device operation is deemed asynchronous in the sense that a memory access device can address several memory units having different access times. Nevertheless, the overall system timing is made adaptively synchronous to that of the various memory units. In addition, the phase-relationship maintained between the first and second series of synchronizing memory access opportunities creates the ability to simultaneously access more than one memory unit at a time.

Figure 6:
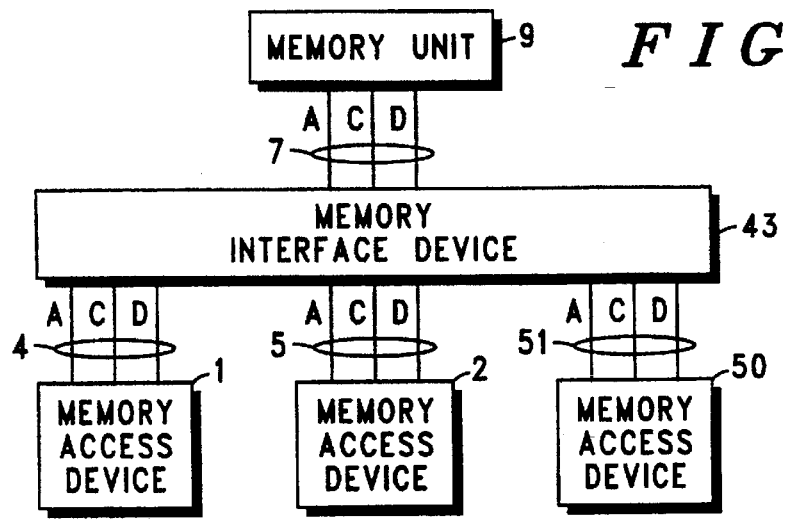
FIG. 6 is a block diagram view of an alternative embodiment of the disclosed data processing system.

Reference is now made to FIG. 6. FIG. 6 shows a block diagram view of an alternative embodiment of the disclosed data processing system. Since it is understood by those skilled in the art that other components and devices would ordinarily be included in this depiction, it will be appreciated that only those elements pertinent to the present invention will be discussed.

In FIG. 6, buses 4,5 and 51 are shown. Of importance, each of these buses comprises a plurality of data, address, and control lines. Connected to each bus is a memory access device 1, 2 and 50. Also connected to bus 4,5 and 51 is the object of this invention, the memory interface device 3. It will be appreciated that device 3 is the same memory interface device discussed previously. Accordingly, its function is to accept access requests from the devices 1, 2 and 50, which may operate either synchronously or asynchronously with the memory interface device 3, and provide them with time-divisioned access to system memory resources. In this effort, FIG. 6 shows a bus 7 connecting a single memory unit 9 to the memory interface device 3.

Figure 7:
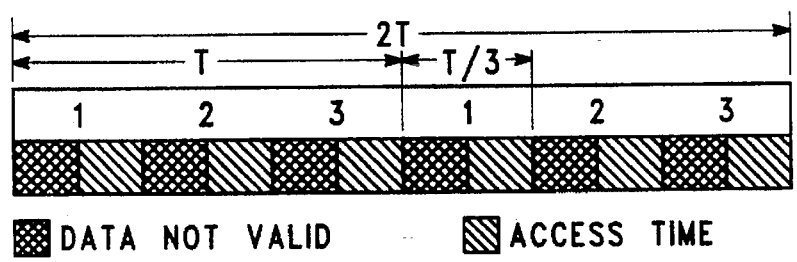
FIG. 7 is a timing diagram showing a series of synchronizing memory access opportunities for the alternative embodiment.

By reference to FIG. 7, it will be appreciated that memory interface device 3 requires but one series of synchronizing access opportunities when it is adapted to interface with a single memory unit. Still, the time-divisioned access of memory unit 9 produces a data processing system which is capable of supporting the operation of various memory access devices regardless of their operating time cycles, yet not subject to the shortcomings of the prior art.

We claim:

1. A data processing system for concurrently accessing a plurality of memory units, wherein an address location in more than one of said plurality of memory units is addressable at the same time, said system comprising:

first and second memory units having different access times;

a memory interface device connected to said first and second memory units via first and second information buses respectively, for concurrently addressing said plurality of memories; and first and second memory access devices connected to said memory interface device via third and fourth information buses, respectively, said plurality of memory access devices exhibiting memory access characteristics such as:

operating time cycles, and synchronous or asynchronous operation with the memory interface device, wherein said memory interface device being connected to said first and second memory access devices and said first and second memory units via respective information buses, provides alternatively (a) concurrent data transfer to and from said first and second memory units and said first and second memory access devices, respectively, and (b) concurrent data transfer to and from said first and second memory units and said second and first memo access devices, respectively.

2. The data processing system of claim 1 wherein said memory interface device includes logic means for creating memory select and memory enable signals for concurrently enabling the plurality of memory units.

3. The data processing system of claim 1 wherein said plurality of memory access devices include means for generating memory access device information for addressing said plurality of memory units.

4. The data processing system of claim 3, wherein said memory access device information includes at least one of the following types of data:

memory access device address;

memory unit address;

input/output commands;

control signals; and access requests.

5. The data processing system according to claim 3, wherein the memory interface device further comprises:

receiving means for accepting and storing memory access device information from a memory access device attempting to address one of the plurality of memory units;

memory addressing means, coupled to the plurality of memory units, for concurrently selecting different memory units from among the plurality of memory units; and controller means, coupled to the memory addressing means and to the receiving means, for controlling communication between a memory access device and the plurality of memory units, such that each memory unit is accessible by one of the memory access devices during a memory access time associated with that memory.

6. The data processing system of claim 5, wherein said receiving means comprises at least one of the following:

a register;
a buffer; and
a latch.

7. The data processing system of claim 5, wherein the communication between a memory access device and the plurality of memory units employs time multiplexing.

8. In a system comprising a first memory unit having a first access time and second memory unit having a second access time, a memory interface device connected to said first and second memory units via separate information buses, respectively, for concurrently addressing said first and second memory units, respectively, and, alternatively, for concurrently addressing said second and first memory units, respectively, and a plurality of memory access devices, coupled to said memory interface device via separate information buses, respectively, said plurality of memory access devices exhibiting memory access characteristics such as: operating time cycles, and synchronous or asynchronous operation with the memory interface device, a method for concurrently interfacing said first and second memory units with said plurality of memory access devices, such that an address location in said first and said second memory unit is addressed at the same time, said method comprising the steps of:

alternatively receiving (a) access requests from said first memory access device attempting to address said first memory unit and, concurrently, access requests from said second memory access device attempting to address said second memory unit, and (b) access requests from said first memory access device attempting to address said second memory unit and, concurrently, access requests from said second memory access device attempting to address said first memory unit;

generating a first series of clocked memory access opportunities corresponding to said first access time, while simultaneously;

generating a second series of clocked memo access opportunities corresponding to said second access time;

synchronizing at least some of the received access requests with said clocked memory access opportunities associated with said first access time, while simultaneously;

synchronizing at least some of the received access requests with said clocked memory access opportunities associated with said second access time; and such that said first and said second memory units are concurrently interfaced with different memory access devices during first and second memory unit clocked memory access opportunities.

9. The method of claim 8, wherein the step of receiving memory access device access requests, further comprises the steps of:

decoding said memory access device access requests; and
addressing a memory unit from among the plurality of memory units.

10. The method of claim 8, wherein the steps of synchronizing access requests with memory access opportunities associated with the first and second memory units, further comprise the steps of:

recognizing an incomplete access opportunity; and
synchronizing said access request upon the next valid access opportunity.

11. The method of claim 8, wherein said steps of generating a first and a second series of clocked memory access opportunities further comprises the steps of:

providing a clock signal;
routing said clock signal to a counter; and
dividing the clock signal within the counter to generate a first and a second series of counter outputs.

12. A memory interface device for concurrently interfacing a first memory having a first access time and a second memory having a second access time different from said first access time with a first memory access device having a first operating time cycle during which access requests are made and a second memory access device having a second operating time cycle during which access requests are made, said memory interface device comprising:

first and second multiplexers, coupled to a first and a second information bus, respectively, for interfacing with said first and second memories, respectively;

first and second device interfaces, coupled to a third and a fourth information bus respectively, for interfacing with said first and second memory access devices, respectively; and first and second controller units, coupled to said first and second device interfaces, each controller unit being coupled to both said first and second multiplexers, for providing alternatively (a) concurrent communications between said first and second memory access devices and said first and second memories, respectively, and (b) concurrent communications between said first and second memory access devices and said second and first memories, respectively.

13. The memory interface device of claim 12 further comprising counter means for generating timing signals supportive of memory interface device synchronization.

14. The memory interface device of claim 12, wherein said first and second operating time cycles have either synchronous operation with the memory interface device; asynchronous operation with the memory interface device or different operating time cycles.

15. A memory interface device according to claim 12, further comprising:

clock means, coupled to said first and second controller units, for simultaneously generating a first and second series of memory access opportunities corresponding to said first and second memory access times, respectively, and circuit means, coupled to said clock means and said first and second controller units, for synchronizing a received memory access request with a clocked memory access opportunity associated with said first access time, while simultaneously synchronizing a received memory access request with a clocked memory access opportunity associated with said second access time.

such that an address location in said first and the second memory units are addressable at the same time by different memory access devices during clocked memory access opportunity associated with that memory, thereby facilitating concurrent data transfers to and from said plurality of memory units and said plurality of memory access devices.

16. A data processing system for concurrently accessing a plurality of memory units, wherein an address location in more than one of said plurality of memory units is addressable at the same time, said system comprising:

first and second memory units having different access times;

a memory interface device connected to said first and second memory units via first and second information buses, respectively, for concurrently addressing said plurality of memories;

first and second memory access devices, connected to said memory interface device via third and fourth information buses, respectively, said plurality of memory access devices exhibiting memory access characteristics including:

operating time cycles, and asynchronous operation with said memory interface device, wherein said memory interface device, being connected to said first and second memory access devices and said first and second memory units via respective information buses, provides concurrent data transfer to and from said first and second memory units and said first and second memory access devices:

third and fourth memory access devices, connected to said memory interface device, said third memory access device connected to said memory interface device via fifth and sixth information buses and said forth memory access device connected to said memory interface device via seventh and eighth information buses, said third and fourth memory access devices exhibiting memory access characteristics including:

operating time cycles, and synchronous operation with said memory interface device, wherein said memory interface device, being connected to said third and fourth memory access devices and said second memory unit via respective information buses, provides concurrent data transfer to and from said second memory unit and said third and fourth memo access devices.

17. The data processing system according to claim 16 further comprising:

a controller unit for providing said operating time cycle to said memory units; and a multiplexer connecting stud memory unit to said controller unit.

18. The data processing system according to claim 17 wherein said controller unit includes logic means for selecting between address/data and control buses from said plurality of memory access devices.

* * * * *

UNITED STATES PATENT AND TRADEMARK OFFICE
CERTIFICATE OF CORRECTION

PATENT NO. : 5,625,796

DATED : April 29, 1997

INVENTOR(S) : John M. Kaczmarczyk; Dale R. Buchholz; Jeffrey A. Slawecki

It is certified that error appears in the above-identified patent and that said Letters Patent is hereby corrected as shown below:

Column 8, Line 29 reads "first memo"--should be "first memory"

Column 9, Line 38 reads "clocked memo"--should be "clocked memory"

Column 12, Line 11 reads "memo access"--should be "memory access"

Column 12, Line 16 reads "stud memory"--should be "said memory"

Signed and Sealed this

Twenty-ninth Day of July, 1997

BRUCE LEHMAN

*Attest:*

*Attesting Officer*      *Commissioner of Patents and Trademarks*